United States Patent
Lozano et al.

(10) Patent No.: US 11,408,096 B2
(45) Date of Patent: Aug. 9, 2022

(54) METHOD OF PRODUCING MECHANOLUMINESCENT FIBERS

(71) Applicant: The Board of Regents of the University of Texas System, Austin, TX (US)

(72) Inventors: Karen Lozano, McAllen, TX (US); Yuanbing Mao, McAllen, TX (US); Carlos Hernandez, Hildalgo, TX (US); Misael E. Martinez, McAllen, TX (US); Mark Anthony Ruiz, McAllen, TX (US); Jorge Ernesto Vidal, McAllen, TX (US); Jose Zuniga, McAllen, TX (US)

(73) Assignee: The Board of Regents of the University of Texas System, Austin, TX (US)

( * ) Notice: Subject to any disclaimer, the term of this patent is extended or adjusted under 35 U.S.C. 154(b) by 151 days.

(21) Appl. No.: 16/644,686

(22) PCT Filed: Sep. 7, 2018

(86) PCT No.: PCT/IB2018/056854
§ 371 (c)(1),
(2) Date: Jul. 14, 2020

(87) PCT Pub. No.: WO2019/049085
PCT Pub. Date: Mar. 14, 2019

(65) Prior Publication Data
US 2020/0283930 A1    Sep. 10, 2020

Related U.S. Application Data

(60) Provisional application No. 62/555,754, filed on Sep. 8, 2017.

(51) Int. Cl.
*B29C 41/04*    (2006.01)
*C09K 11/77*    (2006.01)
(Continued)

(52) U.S. Cl.
CPC .............. *D01F 1/10* (2013.01); *C09K 11/025* (2013.01); *C09K 11/7713* (2013.01);
(Continued)

(58) Field of Classification Search
CPC  B29C 41/04; B29K 2027/14; B29K 2027/16; B29K 2505/00; C09K 11/025;
(Continued)

(56) References Cited

U.S. PATENT DOCUMENTS 2,336,743 A    10/1941  Manning
2,609,566 A    9/1952   Slayter et al.
(Continued)

FOREIGN PATENT DOCUMENTS

CN    1472373       2/2004
CN    101805942     8/2010
(Continued)

OTHER PUBLICATIONS

Translation of CN 102094254 B (published on May 23, 2012).*
(Continued)

*Primary Examiner* — Leo B Tentoni
(74) *Attorney, Agent, or Firm* — Kowert, Hood, Munyon, Rankin & Goetzel, P.C.; Gareth M. Sampson

(57) ABSTRACT

Described herein is the application of centrifugal spinning to provide a flexible mechanoluminescent material composed of rare earth metal doped fibers. Rare earth metal doped fibers are formed, in one embodiment, by centrifugal spinning.

10 Claims, 8 Drawing Sheets

(51) Int. Cl.
*D01D 7/00* (2006.01)
*D01F 1/10* (2006.01)
*C09K 11/02* (2006.01)
*D01D 5/18* (2006.01)
*D01F 6/12* (2006.01)
*B29K 505/00* (2006.01)
*B29K 27/00* (2006.01)

(52) U.S. Cl.
CPC ...... *C09K 11/7715* (2013.01); *C09K 11/7727* (2013.01); *C09K 11/7728* (2013.01); *C09K 11/7741* (2013.01); *D01D 5/18* (2013.01); *D01F 6/12* (2013.01); *B29K 2027/14* (2013.01); *B29K 2027/16* (2013.01); *B29K 2505/00* (2013.01); *D10B 2321/042* (2013.01)

(58) Field of Classification Search
CPC . C09K 11/77; C09K 11/7713; C09K 11/7715; C09K 11/7727; C09K 11/7728; C09K 11/7741; D01D 5/18; D01D 7/00; D01F 1/10; D01F 6/12; D10B 2321/042
USPC ...... 264/8, 21, 211, 211.1, 211.12, 310, 311, 264/331.14
See application file for complete search history.

(56) References Cited

U.S. PATENT DOCUMENTS

| | | | |
|---|---|---|---|
| 3,245,112 | A | 4/1966 | Williamson |
| 3,388,194 | A | 6/1968 | Vinicki |
| 3,428,724 | A | 2/1969 | Billheimer |
| 3,529,934 | A | 9/1970 | Shindo |
| 3,551,557 | A | 12/1970 | Garcia |
| 3,920,362 | A | 11/1975 | Bradt |
| 4,043,331 | A | 8/1977 | Martin et al. |
| 4,070,446 | A | 1/1978 | Horikiri et al. |
| 4,113,666 | A | 9/1978 | Sano et al. |
| 4,323,524 | A | 4/1982 | Snowden |
| 4,323,525 | A | 4/1982 | Bornat |
| 4,374,074 | A | 2/1983 | Ueda et al. |
| 4,526,525 | A | 7/1985 | Oiso et al. |
| 4,790,736 | A | 12/1988 | Keuchel |
| 4,793,782 | A | 12/1988 | Sullivan |
| 4,872,821 | A | 10/1989 | Weiss |
| 5,066,430 | A | 11/1991 | Matthews |
| 5,165,940 | A | 11/1992 | Windley |
| 5,242,633 | A | 9/1993 | Rook et al. |
| 5,326,241 | A | 7/1994 | Rook et al. |
| 5,344,297 | A | 9/1994 | Hills |
| 5,419,794 | A | 5/1995 | Hauber et al. |
| 5,441,754 | A | 8/1995 | Evans, Sr. |
| 5,447,423 | A | 9/1995 | Fuisz et al. |
| 5,458,823 | A | 10/1995 | Perkins et al. |
| 5,460,498 | A | 10/1995 | Steel et al. |
| 5,480,598 | A | 1/1996 | Gentile et al. |
| 5,556,589 | A | 9/1996 | Sibal |
| 5,582,841 | A | 12/1996 | Watton et al. |
| 5,622,671 | A | 4/1997 | Pellegrin et al. |
| 5,667,814 | A | 9/1997 | Shah |
| 5,698,146 | A | 12/1997 | Schippers et al. |
| 5,718,716 | A | 2/1998 | Goddard et al. |
| 5,785,996 | A | 7/1998 | Snyder |
| 5,911,942 | A | 6/1999 | Fofonoff et al. |
| 5,939,120 | A | 8/1999 | Bogue et al. |
| 5,948,334 | A | 9/1999 | Takeuchi et al. |
| 5,972,497 | A | 10/1999 | Hirwe et al. |
| 5,985,193 | A | 11/1999 | Harrington et al. |
| 6,110,590 | A | 8/2000 | Zarkoob et al. |
| 6,159,597 | A | 12/2000 | Meerman et al. |
| 6,216,430 | B1 | 4/2001 | Oppermann |
| 6,221,487 | B1 | 4/2001 | Luo et al. |
| 6,235,392 | B1 | 5/2001 | Luo et al. |
| 6,382,526 | B1 | 5/2002 | Reneker et al. |
| 6,511,930 | B1 | 1/2003 | Luo et al. |
| 6,524,514 | B1 | 2/2003 | Volokitin et al. |
| 6,548,166 | B2 | 4/2003 | Figuly et al. |
| 6,596,033 | B1 | 7/2003 | Luo et al. |
| 6,682,677 | B2 | 1/2004 | Lobovsky et al. |
| 6,713,011 | B2 | 3/2004 | Chu et al. |
| 6,753,454 | B1 | 6/2004 | Smith et al. |
| 6,783,708 | B2 | 8/2004 | Konishi |
| 6,787,090 | B2 | 9/2004 | Dalton et al. |
| 6,843,902 | B1 | 1/2005 | Penner et al. |
| 6,852,410 | B2 | 2/2005 | Veedu et al. |
| 6,858,168 | B1 | 2/2005 | Vollrath et al. |
| 6,872,311 | B2 | 3/2005 | Koslow |
| 6,904,745 | B2 | 6/2005 | Badiali et al. |
| 7,018,188 | B2 | 3/2006 | James et al. |
| 7,032,664 | B2 | 4/2006 | Lord et al. |
| 7,036,592 | B2 | 5/2006 | Nguyen et al. |
| 7,056,455 | B2 | 6/2006 | Matyjaszewski et al. |
| 7,056,849 | B2 | 6/2006 | Wan et al. |
| 7,067,444 | B2 | 6/2006 | Luo et al. |
| 7,118,698 | B2 | 10/2006 | Armantrout et al. |
| 7,127,294 | B1 | 10/2006 | Wang et al. |
| 7,134,857 | B2 | 11/2006 | Andrady et al. |
| 7,146,792 | B2 | 12/2006 | Badiali et al. |
| 7,169,374 | B2 | 1/2007 | Siochi et al. |
| 7,186,474 | B2 | 3/2007 | Jang |
| 7,208,546 | B2 | 4/2007 | Rajagopalan et al. |
| 7,288,306 | B2 | 10/2007 | Kersey |
| 7,316,723 | B2 | 1/2008 | Chung et al. |
| 7,332,050 | B2 | 2/2008 | Kim |
| 7,655,175 | B2 | 2/2010 | Michael et al. |
| 7,666,343 | B2 | 2/2010 | Johnson et al. |
| 7,691,168 | B2 | 4/2010 | Fox et al. |
| 7,763,228 | B2 | 7/2010 | Oya et al. |
| 7,857,608 | B2 | 12/2010 | Fabbricante et al. |
| 7,901,195 | B2 | 3/2011 | Fabbricante et al. |
| 8,110,136 | B2 | 2/2012 | Takahashi et al. |
| 8,163,227 | B2 | 4/2012 | Sumida et al. |
| 8,231,378 | B2 | 7/2012 | Lozano et al. |
| 8,277,711 | B2 | 10/2012 | Huang et al. |
| 8,721,319 | B2 | 5/2014 | Lozano et al. |
| 8,828,294 | B2 | 9/2014 | Lozano et al. |
| 9,228,276 | B2 | 1/2016 | Barton et al. |
| 9,988,271 | B2 | 6/2018 | Lozano et al. |
| 10,087,554 | B2 | 10/2018 | Lozano et al. |
| 10,422,054 | B2 | 9/2019 | Lozano et al. |
| 2001/0033037 | A1 | 10/2001 | Nitschke et al. |
| 2002/0035354 | A1 | 3/2002 | Mirle et al. |
| 2002/0106509 | A1 | 8/2002 | Figuly et al. |
| 2004/0076661 | A1 | 4/2004 | Chu et al. |
| 2004/0096533 | A1 | 5/2004 | Dubson et al. |
| 2004/0241216 | A1 | 12/2004 | Klun et al. |
| 2005/0054830 | A1 | 3/2005 | Islam et al. |
| 2005/0081506 | A1 | 6/2005 | Badiali et al. |
| 2005/0136253 | A1 | 6/2005 | Michael et al. |
| 2005/0163955 | A1 | 7/2005 | Schaefer et al. |
| 2006/0024399 | A1 | 2/2006 | Chang et al. |
| 2006/0048355 | A1 | 3/2006 | Kim |
| 2006/0049542 | A1 | 3/2006 | Chu et al. |
| 2006/0091582 | A1 | 5/2006 | James et al. |
| 2006/0228435 | A1 | 10/2006 | Andrady et al. |
| 2007/0023958 | A1 | 2/2007 | LaVietes et al. |
| 2007/0057414 | A1 | 3/2007 | Hartge |
| 2007/0184079 | A1 | 8/2007 | Gabbay |
| 2008/0023888 | A1 | 1/2008 | Brang et al. |
| 2008/0029617 | A1 | 2/2008 | Marshall et al. |
| 2008/0050304 | A1 | 2/2008 | Oya et al. |
| 2008/0113214 | A1* | 5/2008 | Davis ............... D06M 11/52 428/690 |
| 2008/0136054 | A1 | 6/2008 | Fabbricante et al. |
| 2008/0211121 | A1 | 9/2008 | Lai et al. |
| 2008/0242171 | A1 | 10/2008 | Huang et al. |
| 2009/0020921 | A1 | 1/2009 | Cakmak et al. |
| 2009/0042475 | A1 | 2/2009 | Pourdeyhimi |
| 2009/0102100 | A1 | 4/2009 | Hellring et al. |
| 2009/0142581 | A1 | 6/2009 | Heintz et al. |
| 2009/0155326 | A1 | 6/2009 | Mack et al. |
| 2009/0160099 | A1 | 6/2009 | Huang |
| 2009/0162468 | A1 | 6/2009 | Barinov et al. |
| 2009/0232920 | A1 | 9/2009 | Lozano et al. |

(56) References Cited

U.S. PATENT DOCUMENTS

| | | | |
|---|---|---|---|
| 2009/0269429 | A1 | 10/2009 | Lozano et al. |
| 2009/0280207 | A1 | 11/2009 | Lozano et al. |
| 2009/0280325 | A1 | 11/2009 | Lozano et al. |
| 2010/0168808 | A1 | 7/2010 | Citron |
| 2010/0233115 | A1 | 9/2010 | Patel et al. |
| 2011/0147301 | A1 | 6/2011 | Johnson et al. |
| 2011/0156319 | A1 | 6/2011 | Kurokawa et al. |
| 2012/0077406 | A1 | 3/2012 | Scrivens et al. |
| 2012/0082711 | A1 | 4/2012 | Goranov |
| 2012/0135448 | A1 | 5/2012 | Parker et al. |
| 2012/0292795 | A1 | 11/2012 | Peno |
| 2012/0292796 | A1 | 11/2012 | Peno |
| 2012/0292810 | A1 | 11/2012 | Peno |
| 2012/0294966 | A1 | 11/2012 | Peno |
| 2012/0295021 | A1 | 11/2012 | Peno |
| 2012/0304613 | A1 | 12/2012 | Peno |
| 2013/0149367 | A1 | 6/2013 | Messier et al. |
| 2013/0214442 | A1 | 8/2013 | Naskar |
| 2013/0299748 | A1 | 11/2013 | Kazaryan et al. |
| 2014/0025179 | A1 | 2/2014 | Kay et al. |
| 2014/0159263 | A1 | 6/2014 | Lozano et al. |
| 2015/0184317 | A1 | 7/2015 | Lozano et al. |
| 2015/0354094 | A1 | 12/2015 | Parker et al. |
| 2016/0015098 | A1 | 1/2016 | Conlon |
| 2016/0053172 | A1* | 2/2016 | Mori ............... C08L 101/00 252/301.36 |

FOREIGN PATENT DOCUMENTS

| | | |
|---|---|---|
| CN | 101922060 | 12/2010 |
| CN | 102094254 | 6/2011 |
| CN | 209584428 | 3/2019 |
| DE | 19621231 | 7/1997 |
| EP | 0 003 908 | 9/1979 |
| EP | 0 306 033 | 3/1989 |
| EP | 0 472 067 | 2/1992 |
| EP | 0 709 035 | 5/1996 |
| EP | 1 673 493 | 7/2009 |
| JP | 2001073222 | 3/2001 |
| JP | 2009270221 | 11/2009 |
| KR | 20040052685 | 6/2004 |
| WO | 03/042436 | 5/2003 |
| WO | 2004/056716 | 7/2004 |
| WO | 2005024101 | 3/2005 |
| WO | 2005/042813 | 5/2005 |
| WO | 2009/079523 | 6/2006 |
| WO | 2008/077349 | 7/2008 |
| WO | 2008/121338 | 10/2008 |
| WO | 2010/132636 | 11/2010 |
| WO | 2012/068402 | 5/2012 |

OTHER PUBLICATIONS

International Search Report and Written Opinion issued in PCT/IB2018/056854 dated Jan. 17, 2019.
Wang et al. "Controllable fabrication and properties of polypropylene nanofibers" Polymer Engineering and Science (2007) 47(11), 1865-1872.
Fang et al. "Needleless Melt-Electrospinning of Polypropylene Nanofibers" Journal of Nanomaterials, (2012) 1-9.
Watanabe "Effect of organic solvent on morphology and mechanical properties of electrospun syndiotactic polypropylene nanofibers" Polymer Bulletin (2011) 67(9), 2025-2033.
Watanabe et al. "Development of Polypropylene Nanofiber Production System" Polymer Reviews (2011) 51(3), 288-308.
Raghaven et al. "Fabrication of Melt Spun Polypropylene Nanofibers by ForcespinningTM" (2013) Journal of Engineered Fibers and Fabrics vol. 8, Issue 1, Mar. 2013.
Ondarcuhu et al. "Drawing a single nanofibre over hundreds of microns", Europhysics Letters (1998), 42(2), 215-220.
Feng et al. "Super-hydrophobic surface of aligned polyacrylonitrile nanofibers" Angewandte Chemie (International ed. in English) (2002), 41(7), 1221-3.

Martin "Membrane-Based Synthesis of Nanomaterials", Chemistry of Materials (1996) 8(8), 1739-1746.
Ma et al. "Synthetic nano-scale fibrous extracellular matrix", Journal of Biomedical Materials Research (1999) 46(1), 60-72.
Liu et al."Polystyrene-block-poly (2-cinnamoylethyl methacrylate) nanofibers—preparation, characterization, and liquid crystalline properties" Chemistry-A European Journal (1999), 5(9), 2740-2749.
Whitesides et al."Self-assembly at all scales", Science (New York, N.Y.) (2002), 295(5564), 2418-21.
Deitzel et al. "Controlled deposition of electrospun poly (ethylene oxide) fibers", Polymer, (2001) 42(19), 8163-8170.
Doshi et al. "Electrospinning process and applications of electrospun fibers" Journal of Electrostatics (1995), 35(2&3), 51-60.
Subbiah et al. "Electrospinning of nanofibers" Journal of Applied Polymer Science (2005) 96(2), 557-569.
Ellison et al. "Melt blown nanofibers: Fiber diameter distributions and onset of fiber breakup" Polymer (2007) 48(11), 3306-3316.
Theron et al. "Multiple jets in electrospinning: experiment and modeling", Polymer (2005), 46(9), 2889-2899.
Tomaszewski et al. "Investigation of electrospinning with the use of a multi-jet electrospinning head" Fibres & Textiles in Eastern Europe (2005) 13(4), 22-26.
Zhou et al. "Three-jet electrospinning using a flat spinneret" J. Mater Sci. (2009), 44, 5501-5508.
Han et al. "Superhydrophobic and oleophobic fibers by coaxial electrospinning" Langmuir (2009), 25(16), 9454-9462.
Xiong et al."Fabrication of ultrafine fibrous polytetrafluoroethylene porous membrane by electrospinning" Journal of Materials Research (2009), 24(9), 2755-2761.
Scheffler et al. "Electrospun teflon AF fibers for superhydrophobic membranes" Journal of Materials Research (2010) 25(8), 1595-1600.
Rein et al. "Electrospinning of ultrahigh-molecularweight polyethylene nanofibers", Journal of Polymer Science: Part B: Polymer Physics (2007) 45(7), 766-773.
Wang et al. "Solution-electrospun isotactic polypropylene fibers: processing and microstructure development during stepwise annealing" Macromolecules (2010), 43(21), 9022-9029.
Tan et al."Meltblown fibers: Influence of viscosity and elasticity on diameter distribution" J. Non-Newtonian Fluids Mechanics (2010), 165(15-16), 892-900.
Rangkupan et al. "Electrospinning process of molten polypropylene in vacuum" Journal of Metals, Materials and Minerals (2003) 12(2), 81-87.
Lyons et al."Meltelectrospinning part I: processing parameters and geometric properties" Polymer (2004) 45, 7597-7603.
Zhmayev et al. "Nanofibers from gas-assisted polymer melt electrospinning", Polymer (2010), 51(18), 4140-4144.
Assouline et al. "Nucleation ability of multiwalled carbon nanotubes in polypropylene composites" Journal of Polymer Science Part B: Polymer Physics (2003) 41(5), 520-527.
Garbarczyk et al. "Polymorphism of isotactic polypropylene in presence of additives, in blends and in composites" Journal of Macromolecular Science, Part B—Physics (2002), 41 (4-6), 1267-1278.
Meille et al. "Structure of β-isotactic polypropylene: a long-standing structural puzzle" Macromolecules (1994) 27(9), 2615-2622.
Dorset et al."Isotactic polypropylene, β-phase: a study in frustration" Polymer (1998), 39(25), 6331-6337.
Cho et al. "Structural properties and superhydrophobicity of electrospun polypropylene fibers from solution and melt", Polymer (2010), 51(25), 6005-6012.
Lee et al. "Influence of a mixing solvent with tetrahydrofuran and N, N-dimethylformamide on electrospun poly (vinylchloride) nonwoven mats" Journal of Polymer Science Part B: Polymer Physics (2002), 40(19), 2259-2268.
Reneker et al."Nanofiber garlands of polycarpolactone by electrospinning" Polymer (2002) 43(25), 6785-6794.
Baji et al "Electrospinning of polymer nanofibers: effects on oriented morphology, structures and tensile properties" Composites Science and Technology (2010) 70(5), 703-718.

(56) References Cited

OTHER PUBLICATIONS

Aquilano et al. "{1 0 0} and {1 1 1} forms of the NaCl crystals coexisting in growth from pure aqueous solution" Journal of Crystal Growth (2009) 311(2):399-403.
Badrossamay et al. "Nanofiber Assembly by Rotary Jet-Spinning" Nano Lett. 2010, 10, 2257-2261.
Champion et al. "Making Micro- and Nanoparticles of Complex Shapes" PNAS, 2007, 104:11901-11904.
"Cotton Candy Express" Available at http://cottoncandyexpress.com/resimachine, Jun. 8, 2009.
Cui et al. "Facile synthesis of core/shell-structured Sn/onion-like carbon nanocapsules as high-performance anode material for lithium-ion batteries" Materials Letters (2015) 143: p. 35-37.
Dabirian et al. "A comparative study of jet formation and nanofiber alignment in electrospinning and electrocentrifugal spinning systems" Journal of Electrostatics (2011) 69(6): p. 540-546.
Daunder "Centrifuge Spinning—An Economic Alternative to Electrospinning" Nano-Cluster Bodensee, NanoEurope 2006, Sep. 14, 2006.
Foster et al. "Centrifugally Spun Polyhydroxybutyrate Fibres: Accelerated Hydrolytic Degredation Studies" Polymer Degradation and Stability, 2005, 87(1), 1-10. (Abstract).
Greensfelder "Nanofibers Created in Orderly Fashion" UC Berkeley Press Release, Jun. 1, 2009.
Ji et al. "Recent developments in nanostructured anode materials for rechargeable lithium-ion batteries" Energy & Environmental Science (2011) 4(8): p. 2682-2699.
Jiang et al. "Centrifugally-spun tin-containing carbon nanofibers as anode material for lithium-ion batteries" Journal of Materials Science (2015) 50(3): p. 1094-1102.
Kamal et al. "Synthesis and catalytic properties of silver nanoparticles supported on porous cellulose acetate sheets and wet-spun fibers." Carbohydrate Polymers (2017) 157, 294-302.
Koczkur et al. "Polyvinylpyrrolidone (PVP) in nanoparticle synthesis" Dalton Transactions (2015) 44:41, 17883-17905.
Li et al. "Carbon encapsulated ultrasmall $SnO_2$ nanoparticles anchoring on graphene/$TiO_2$ nanoscrolls for lithium storage" Electrochimica Acta (2014) 147(0): p. 40-46.
"Liu et al. ""Preparation of Nanocrystalline Titanium Dioxide Fibers Using Sol-gel Method and Centrifugal Spinning"" J Sol-Gel Sci Technol (2013) 65:443-451."
Mellado et al. "A simple model for nanofiber formation by rotary jet-spinning" Applied Physics Letters (2011) 99, 203107.
"Nonwovens Interactive", Jun. 8, 2009.
Patel et al. "Novel Preparation Method of Silicon Carbide Nanofibers by Use of Polymer Blend and Melt Spinning Techniques" Journal of Ceramic Society of Japan (2004) 112:S901-S903.
Quintero et al. "Rapid Production of Ultralong Amorphous Ceramic Nanofibers by Laser Spinning" App. Physics Let (2007) 90:153109.
Rodriguez et al. "Preparation of Electrospun Chitosa-PEO Fibers" Bioengineering Conference, 2006, Proceedings of the IEEE 32nd Annual Northeast, 87-88, Apr. 2006.
Shen et al. "Tin nanoparticle-loaded porous carbon nanofiber composite anodes for high current lithium-ion batteries" Journal of Power Sources (2015) 278: p. 660-667.
Tran et al. "Electrospun $SnO_2$ and $TiO_2$ Composite Nanofibers for Lithium Ion Batteries" Electrochimica Acta (2014) 117(0): p. 68-75.
Tsuji et al. "Rapid transformation from spherical nanoparticles, nanorods, cubes, or bipyramids to triangular prisms of silver with PVP, citrate, and $H_2O_2$" Langmuir (2012) 28:24, 8845-8861.
Warner et al. "Cost Effective Nanofiber Formation: Melt Electrospinning" National Textile Center Annual Report, Nov. 2005.
Weitz et al. "Polymer Nanofibers Via Nozzle-Free Centrifugal Spinning" Nano Letters (2008), 8:1187-1191.
Xia et al. "The effects of electrospinning parameters on coaxial Sn/C nanofibers: Morphology and lithium storage performance" Electrochimica Acta (2014) 121(0): p. 345-351.
Zheng et al. "Controlled Crystallization of Sodium Chloride Nanocrystals in Microdroplets Produced by Electrospray from an Ultra-Dilute Solution" European Journal of Inorganic Chemistry (2016), No. 12, 1860-1865.
Zhong et al. "Nanostructued core-shell Sn nanowires @ CNTs with controllable thickness of CNT shells for lithium ion battery" Applied Surface Science (2015) 332: p. 192-197.
"Manufacturing: Synthetic and Cellulosic Fiber Formation Technology" www.fibersource.com/f-tutor/techpag.htm Apr. 7, 2011.
European Extended Search Report and European Search Opinion issued in EP18854957.0 dated Apr. 12, 2021.

\* cited by examiner

METHOD OF PRODUCING MECHANOLUMINESCENT FIBERS

STATEMENT REGARDING FEDERALLY SPONSORED RESEARCH OR DEVELOPMENT

This work was supported by National Science Foundation under DMR grant #1523577. The government has certain rights in the invention.

BACKGROUND OF THE INVENTION

1. Field of the Invention

The present invention generally relates to the field of mechanoluminescent fiber production.

2. Description of the Relevant Art

Mechanoluminescent materials offer promising opportunities to be used in a variety of applications such as display devices, detection and localization of damage in aircrafts and spaceships, crafts, sensors, as a layer component in light emitting diodes, biomaterials, safety related applications, in the entertainment industry, and for high tech apparel.

Regarding the mechanoluminescent (ML) effect, the literature has generally focused on the photoluminescence effect. Few reports have discussed the effect of rare-earth complexes as reinforcements in polymer composites, and those that have conducted these studies have focused on bulk/film development or microfibers coated with rare earth complexes. The ability to develop ML fibers in situ would allow high flexibility in the materials, ease in fabrication, and higher surface area to further enhance the ML response (decrease concentration of rare earth elements).

BRIEF DESCRIPTION OF THE DRAWINGS

Advantages of the present invention will become apparent to those skilled in the art with the benefit of the following detailed description of embodiments and upon reference to the accompanying drawings in which.

Figure 1:
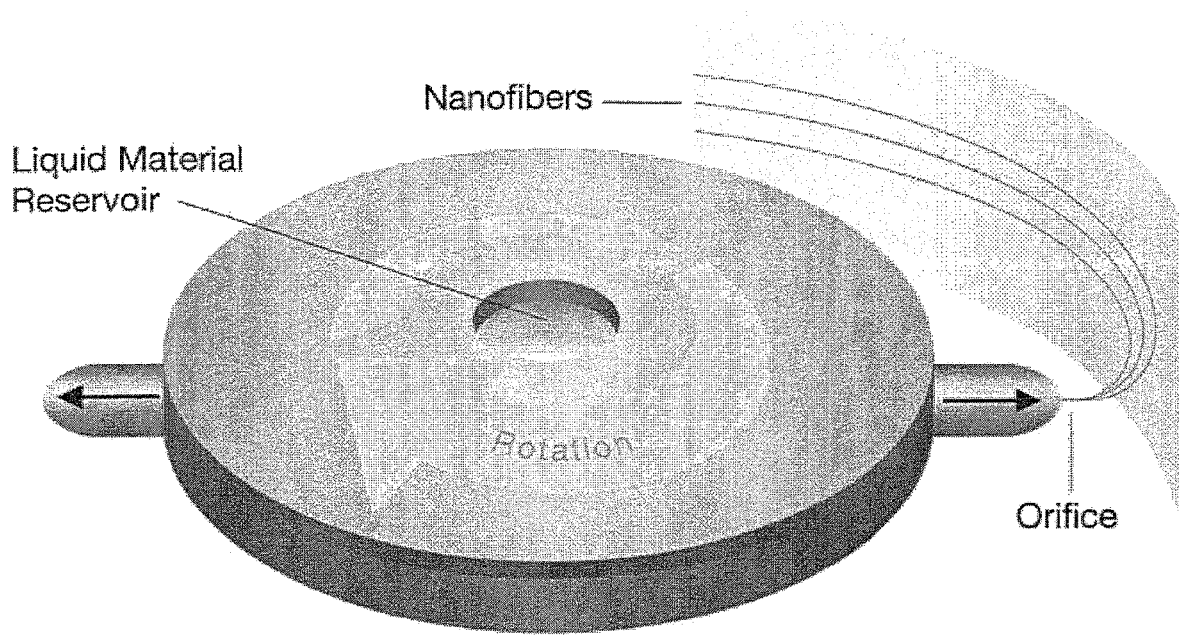
FIG. 1 depicts a schematic diagram of fiber formation using centrifugal spinning.

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

It is to be understood the present invention is not limited to particular devices or methods, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a method or apparatus that "comprises," "has," "includes" or "contains" one or more steps or elements possesses those one or more steps or elements, but is not limited to possessing only those one or more steps or elements. Likewise, an element of an apparatus that "comprises," "has," "includes" or "contains" one or more features possesses those one or more features, but is not limited to possessing only those one or more features.

In an embodiment, a method of producing mechanoluminescent fibers, comprising placing a solution comprising a polymer and a rare earth complex into a body of a fiber producing device and rotating the fiber producing device at a speed sufficient to cause the solution in the body to be passed out of the body to produce rare earth metal doped fibers.

As used herein the term "rare earth metal" refers to the fifteen lanthanide elements, as well as scandium and yttrium. Specifically the rare-earth elements include cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), ytterbium (Yb) and yttrium (Y). In a preferred embodiment, the rare earth metal is cerium or europium. In a preferred embodiment, the rare earth metal is in the form of a nitrate or sulfate complex.

The polymer used may be any polymer which, in combination with the rare earth metal, creates a material that exhibits a mechanoluminescent effect. Suitable polymers include, but are not limited to, polystyrene, poly(vinyl difluoride), poly(acrylonitrile) and poly(methyl methacrylate), polyethylene, and polypropylene. In a preferred embodiment, the polymer comprises polyvinyl-difluoride.

The operating parameters of the fiber producing process may be adjusted to produce rare earth metal doped microfibers and/or rare earth metal doped nanofibers.

The rare earth metal doped fibers may be used to form a mechanoluminescent material. In some embodiment, the mechanoluminescent material is a fabric or mesh formed from the rare earth metal doped fibers. In other embodiments, the mechanoluminescent material is a fabric or other material that is embedded with rare earth metal doped fibers.

In an embodiment, a method of producing rare earth metal doped fibers uses a solution spinning process. In a solution spinning process, a solution of the polymer and the rare earth metal (usually in the form of a complex) is placed into a body of a fiber producing device. The body of the fiber producing device comprises one or more openings. The openings are sized such that when the material disposed in the body is ejected, the material will be formed into microfibers and/or nanofibers. As used herein the term "microfibers" refers to fibers having a diameter of less than 1 mm. As used herein the term "nanofibers" refers to fibers having a diameter of less than 1 µm.

The solution of the polymer and the rare earth metal typically includes polar solvents, such as dimethylacetamide (DMA), acetone, or combinations thereof. The specific solvent system used is selected based on the specific requirements of the polymer and the rare earth metal.

The fiber producing device is rotated at a speed of at least about 500 rpm. Rotation of the fiber producing device causes the solution in the body to be passed through one or more openings to produce fibers (e.g., microfibers and/or nanofibers). The fibers are created without subjecting the fibers, during their creation, to an externally applied electric field (known, hereinafter, as "centrifugal spinning"). Apparatuses and methods that may be used to create the fibers are described in the following U.S. Published Patent Applications: 2009/0280325; 2009/0269429; 2009/0232920; and 2009/0280207, all of which are incorporated herein by reference.

In some embodiments, the fibers are collected as a mat of the fibers. In other embodiments, the fibers are collected by depositing the fibers onto a support. Suitable supports include, but are not limited to a polymeric mesh.

In certain methods described herein, material spun in a fiber producing device may undergo varying strain rates, where the material is kept as a melt or solution. Since the strain rate alters the mechanical stretching of the fibers created, final fiber dimension and morphology may be significantly altered by the strain rate applied. Strain rates are affected by, for example, the shape, size, type and RPM of a fiber producing device. Altering the viscosity of the material, such as by increasing or decreasing its temperature or adding additives (e.g., thinner), may also impact strain rate. Strain rates may be controlled by a variable speed fiber producing device. Strain rates applied to a material may be varied by, for example, as much as 50-fold (e.g., 500 RPM to 25,000 RPM).

Temperatures of the material, fiber producing device and the environment may be independently controlled using a control system. The temperature value or range of temperatures employed typically depends on the intended application. For example, for many applications, temperatures of the material, fiber producing device and the environment typically range from −4° C. to 400° C. Temperatures may range as low as, for example, −20° C. to as high as, for example, 2500 C. For solution spinning, ambient temperatures of the fiber producing device are typically used.

As the material is ejected from the spinning fiber producing device, thin jets of the material are simultaneously stretched and dried in the surrounding environment. Interactions between the material and the environment at a high strain rate (due to stretching) lead to solidification of the material into polymeric fibers, which may be accompanied by evaporation of solvent. By manipulating the temperature and strain rate, the viscosity of the material may be controlled to manipulate the size and morphology of the polymeric fibers that are created. With appropriate manipulation of the environment and process, it is possible to form polymeric fibers of various configurations, such as continuous, discontinuous, mat, random fibers, unidirectional fibers, woven and unwoven, as well as fiber shapes, such as circular, elliptical and rectangular (e.g., ribbon). Other shapes are also possible. The produced fibers may be single lumen or multi-lumen.

By controlling the process parameters, fibers can be made in micron, sub-micron and nano-sizes, and combinations thereof. In general, the fibers created will have a relatively narrow distribution of fiber diameters. Some variation in diameter and cross-sectional configuration may occur along the length of individual fibers and between fibers.

Generally speaking, a fiber producing device helps control various properties of the fibers, such as the cross-sectional shape and diameter size of the fibers. More particularly, the speed and temperature of a fiber producing device, as well as the cross-sectional shape, diameter size and angle of the outlets in a fiber producing device, all may help control the cross-sectional shape and diameter size of the fibers. Lengths of fibers produced may also be influenced by fiber producing device choice.

The speed at which a fiber producing device is spun may also influence fiber properties. The speed of the fiber producing device may be fixed while the fiber producing device is spinning, or may be adjusted while the fiber producing device is spinning. Those fiber producing devices whose speed may be adjusted may, in certain embodiments, be characterized as "variable speed fiber producing devices." In the methods described herein, the structure that holds the material may be spun at a speed of about 500 RPM to about 25,000 RPM, or any range derivable therein. In certain embodiments, the structure that holds the material is spun at a speed of no more than about 50,000 RPM, about 45,000 RPM, about 40,000 RPM, about 35,000 RPM, about 30,000 RPM, about 25,000 RPM, about 20,000 RPM, about 15,000 RPM, about 10,000 RPM, about 5,000 RPM, or about 1,000 RPM. In certain embodiments, the structure that holds the material is rotated at a rate of about 5,000 RPM to about 25,000 RPM.

In an embodiment, the solution may be positioned in a reservoir of the fiber producing device. The reservoir may, for example, be defined by a concave cavity of the fiber producing device. In certain embodiments, the fiber producing device includes one or more openings in communication with the concave cavity. The fibers are extruded through the opening while the fiber producing device is rotated about a spin axis. The one or more openings have an opening axis that is not parallel with the spin axis. The fiber producing device may include a body that includes the concave cavity and a lid positioned above the body such that a gap exists between the lid and the body, and the nanofiber is created as a result of the rotated material exiting the concave cavity through the gap.

Certain fiber producing devices have openings through which material is ejected during spinning. Such openings may take on a variety of shapes (e.g., circular, elliptical, rectangular, square, triangular, or the like) and sizes: (e.g., diameter sizes of 0.01-0.80 mm are typical). The angle of the opening may be varied between ±15 degrees. The openings may be threaded. An opening, such as a threaded opening, may hold a needle, where the needle may be of various shapes, lengths and gauge sizes. Threaded holes may also be used to secure a lid over a cavity in the body of a fiber producing device. The lid may be positioned above the body such that a gap exists between the lid and the body, and a fiber is created as a result of the spun material exiting the cavity through the gap. Fiber producing devices may also be configured such that one fiber producing device may replace another within the same apparatus without the need for any adjustment in this regard. A universal threaded joint attached to various fiber producing devices may facilitate this replacement. Fiber producing devices may also be configured to operate in a continuous manner.

Any method described herein may further comprise collecting at least some of the microfibers and/or nanofibers that are created. As used herein "collecting" of fibers refers to fibers coming to rest against a fiber collection device. After the fibers are collected, the fibers may be removed from a fiber collection device by a human or robot. A variety of methods and fiber (e.g., nanofiber) collection devices may be used to collect fibers. For example, regarding nanofibers, a collection wall may be employed that collects at least some of the nanofibers. In certain embodiments, a collection rod collects at least some of the nanofibers. The collection rod may be stationary during collection, or the collection rod may be rotated during collection.

Regarding the fibers that are collected, in certain embodiments, at least some of the fibers that are collected are continuous, discontinuous, mat, woven, unwoven or a mixture of these configurations. In some embodiments, the fibers are not bundled into a cone shape after their creation. In some embodiments, the fibers are not bundled into a cone shape during their creation. In particular embodiments, fibers are not shaped into a particular configuration, such as a cone figuration, using air, such as ambient air, that is blown onto the fibers as they are created and/or after they are created.

Present method may further comprise, for example, introducing a gas through an inlet in a housing, where the housing surrounds at least the fiber producing device. The gas may be, for example, nitrogen, helium, argon, or oxygen. A mixture of gases may be employed, in certain embodiments.

The environment in which the fibers are created may comprise a variety of conditions. For example, any fiber discussed herein may be created in a sterile environment. As used herein, the term "sterile environment" refers to an environment where greater than 99% of living germs and/or microorganisms have been removed. In certain embodiments, "sterile environment" refers to an environment substantially free of living germs and/or microorganisms. The fiber may be created, for example, in a vacuum. For example the pressure inside a fiber producing system may be less than ambient pressure. In some embodiments, the pressure inside a fiber producing system may range from about 1 millimeters (mm) of mercury (Hg) to about 700 mm Hg. In other embodiments, the pressure inside a fiber producing system may be at or about ambient pressure. In other embodiments, the pressure inside a fiber producing system may be greater than ambient pressure. For example the pressure inside a fiber producing system may range from about 800 mm Hg to about 4 atmospheres (atm) of pressure, or any range derivable therein.

In certain embodiments, the fiber is created in an environment of 0-100% humidity, or any range derivable therein. The temperature of the environment in which the fiber is created may vary widely. In certain embodiments, the temperature of the environment in which the fiber is created can be adjusted before operation (e.g., before rotating) using a heat source and/or a cooling source. Moreover, the temperature of the environment in which the fiber is created may be adjusted during operation using a heat source and/or a cooling source. The temperature of the environment may be set at sub-freezing temperatures, such as −20° C., or lower. The temperature of the environment may be as high as, for example, 2500° C.

The fibers that are created may be, for example, one micron or longer in length. For example, created fibers may be of lengths that range from about 1 μm to about 50 cm, from about 100 μm to about 10 cm, or from about 1 mm to about 1 cm. In some embodiments, the fibers may have a narrow length distribution. For example, the length of the fibers may be between about 1 μm to about 9 μm, between about 1 mm to about 9 mm, or between about 1 cm to about 9 cm. In some embodiments, when continuous methods are performed, fibers of up to about 10 meters, up to about 5 meters, or up to about 1 meter in length may be formed.

In certain embodiments, the cross-section of the fiber may be circular, elliptical or rectangular. Other shapes are also possible. The fiber may be a single-lumen lumen fiber or a multi-lumen fiber.

In another embodiment of a method of creating a fiber, the method includes: spinning material to create the fiber; where, as the fiber is being created, the fiber is not subjected to an externally-applied electric field or an externally-applied gas; and the fiber does not fall into a liquid after being created.

EXAMPLES

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

This experiment focuses on the development and optimization of a scalable method to produce cerium complex doped polyvinyl-difluoride fine fibers. Centrifugal spinning was utilized to obtain nonwoven fiber mats of the cerium complex doped polyvinyl-difluoride fine fibers. Processing key variables were angular spinning velocity, and concentration of cerium complex. Scanning electron microscopy, X-ray diffraction, Fourier transform infrared spectroscopy, piezoelectricity and luminescence analysis was conducted. The developed system showed a significant enhancement in the beta phase and inhibition of the non-polar alpha phase upon fiber formation. The beta phase significantly contributed to the piezoelectric response, up to 5.58 volts were generated upon tapping the flexible nonwoven fiber mat. Luminescence analysis shows a notable photoluminescence effect in the UV region.

Experimental Method

FIG. 1 shows a schematic diagram of fiber formation using centrifugal spinning. The polymer solution is forced through the orifices of the spinneret by applying centrifugal force. As polymer solution is ejected through the orifices, continuous polymer jets are formed and are stretched into formation of fine web of fibers due to applied centrifugal force and shear force acting across the tip of orifices of the spinneret. The web is collected on a collector system. Fiber formation and morphology of the formed web are dictated by solution concentration, rotational speed, distance between collection system and spinneret and gauge size of the spinneret.

Solutions were prepared by dissolving polyvinyl-difluoride (PVDF) in a 1:1 mixture of N,N-dimethylacetamide (DMA) and acetone. Various concentrations of ammonium cerium(IV) sulfate or ammonium cerium(IV) nitrate were added (2.5% wt, 5% wt, 7.5% wt) to the polymer solution Fibers were produced in a Cyclone L1000M (Fiberio Technology Corporation) system. Angular velocity ranged from 4000-8000 RPM. Fibers were carefully collected in an aligned configuration using a square collector.

The resulting fibers were tested using scanning electron microscopy, X-ray diffraction, Fourier transform infrared spectroscopy, piezoelectricity and luminescence analysis.

Results

Figure 2A:
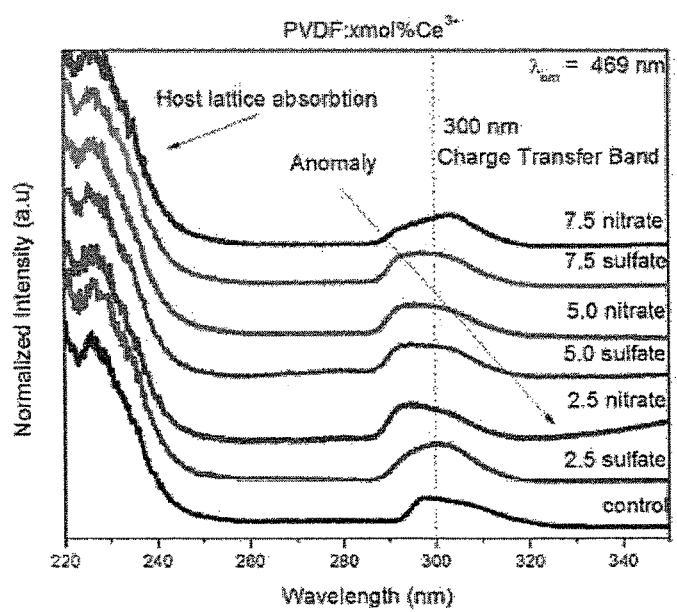
FIG. 2A depicts a normalized photoluminescence excitation for a series of PVDF fibers doped with cerium (IV) complexes.
Figure 2B:
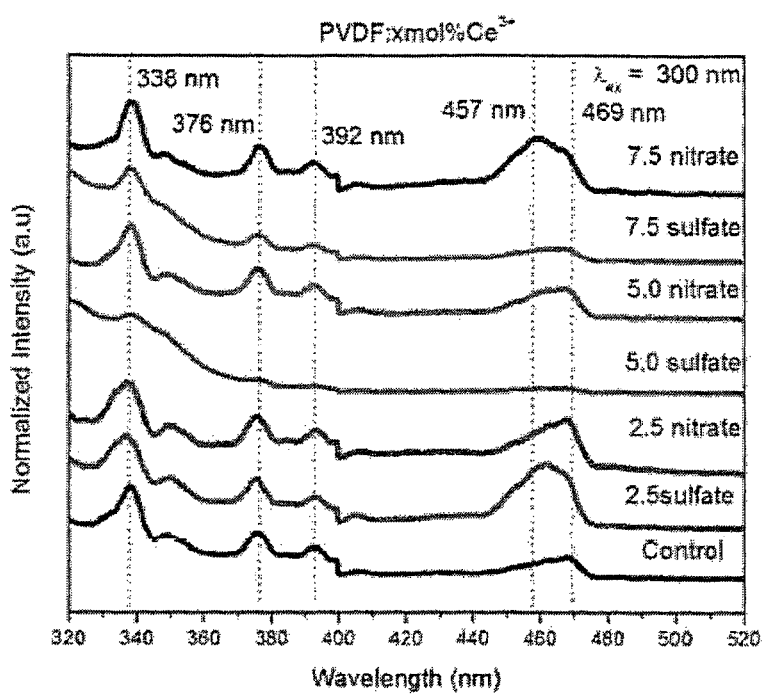
FIG. 2B depicts a normalized photoluminescence emission spectra of a series of PVDF fibers doped with cerium (IV) complexes.
Figure 2C:
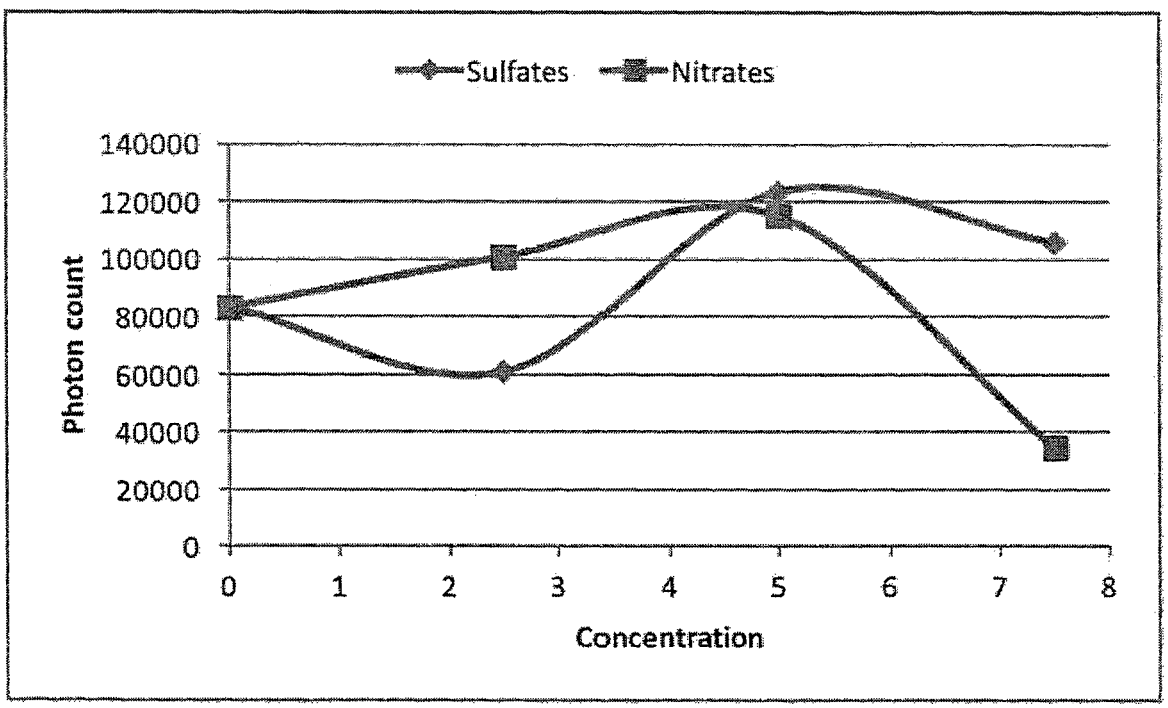
FIG. 2C depicts a photon count representation vs. concentration of $Ce^{+3}$ in cerium doped PVDF fibers.

FIG. 2A depicts a normalized photoluminescence excitation for a series of PVDF fibers doped with cerium (IV) nitrate (2.5% wt, 5% wt, 7.5% wt) and cerium (IV) sulfate (2.5% wt, 5% wt, 7.5% wt). FIG. 2B depicts a normalized photoluminescence emission spectra of the same series of PVDF fibers. FIG. 2C depicts a photon count representation vs. concentration of $Ce^{+3}$ in cerium doped PVDF fibers.

Figure 3:
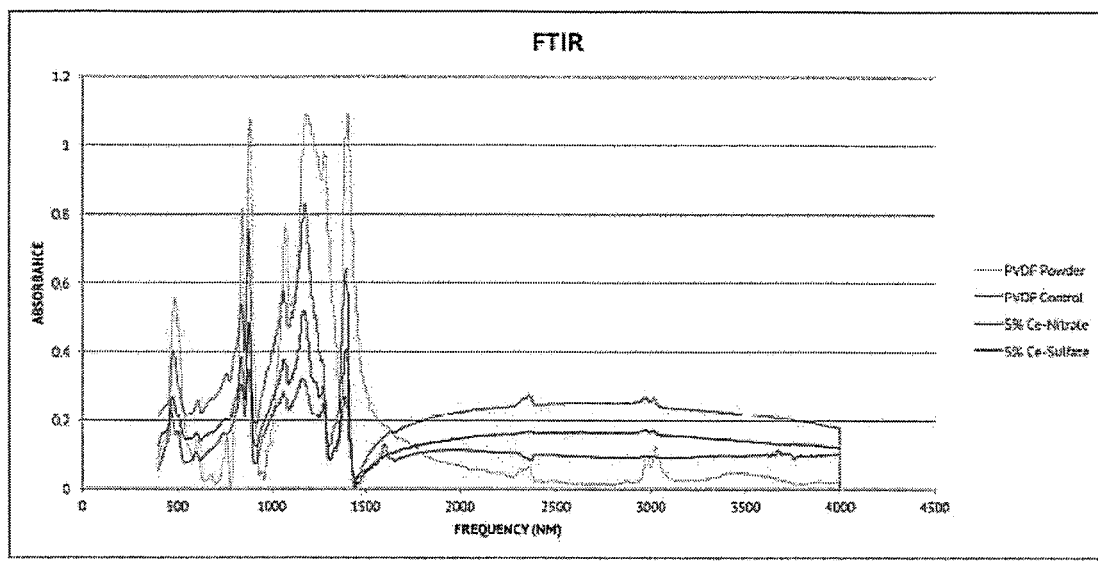
FIG. 3 depicts a Fourier transform infrared spectroscopy analysis of PVDF fibers doped with cerium (IV) nitrate and sulfate complexes.
Figure 4:
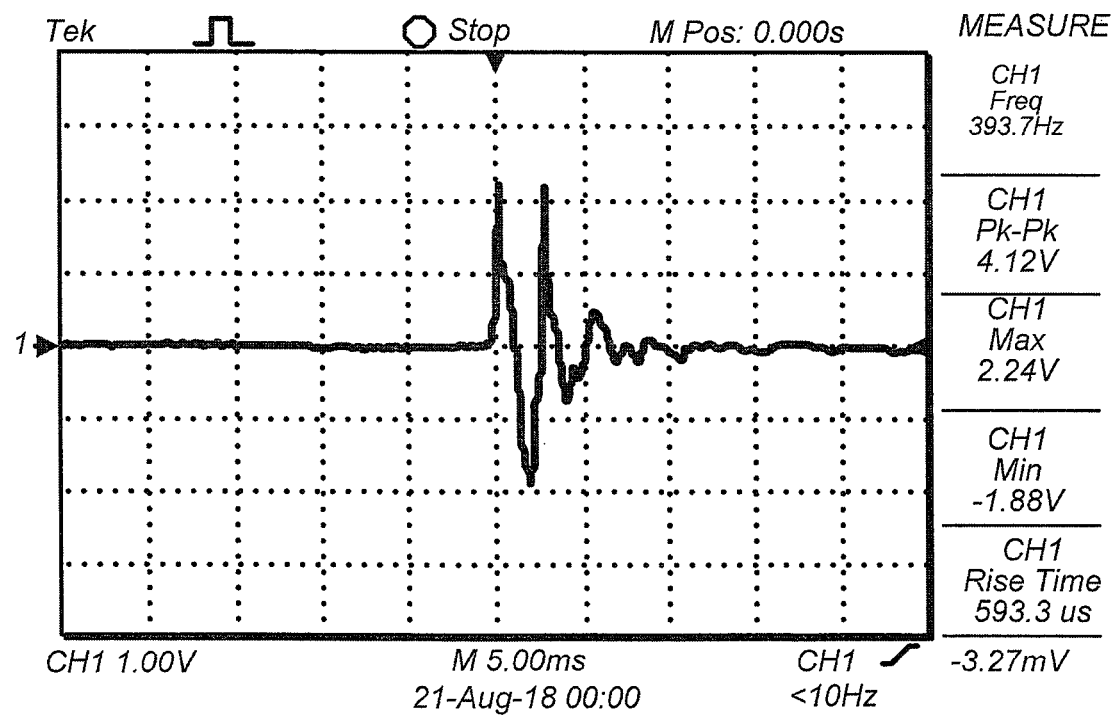
FIG. 4 depicts a graph of showing a change in voltage during piezoelectric testing of cerium doped PVDF fibers.

FIG. 3 depicts a Fourier transform infrared spectroscopy analysis of PVDF fibers doped with cerium (IV) nitrate (5% wt) and sulfate (5% wt) complexes compared to controls (PVDF powder and undoped PVDF fibers);

FIG. 5 shows a piezoelectric effect in the cerium doped fibers. Having a piezoelectric effect is beneficial for ML since there is a synergy of using mechanical input to create a ML effect. Producing an electrical response provides a current to maintain the optical response from the mechanical input.

Figure 5A:
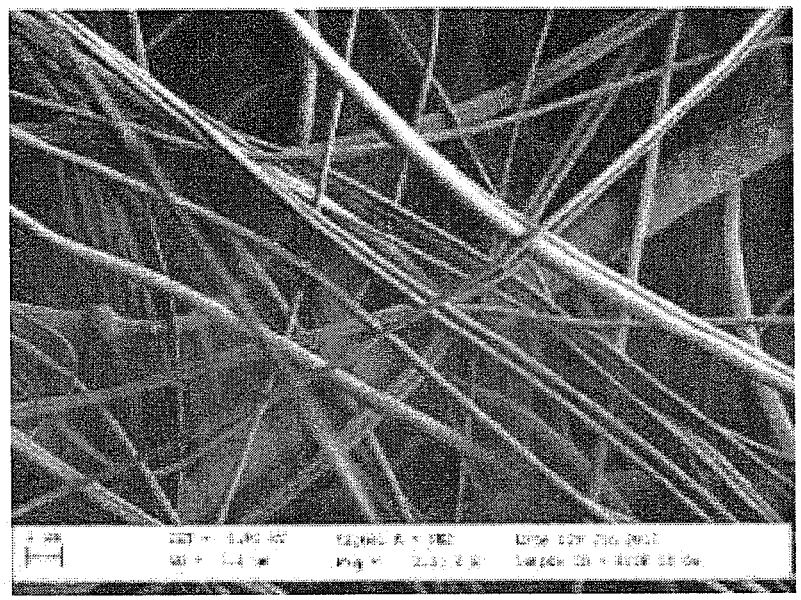
FIG. 5A depicts an SEM image of 5% Ce sulfate doped PVDF fibers.
Figure 5B:
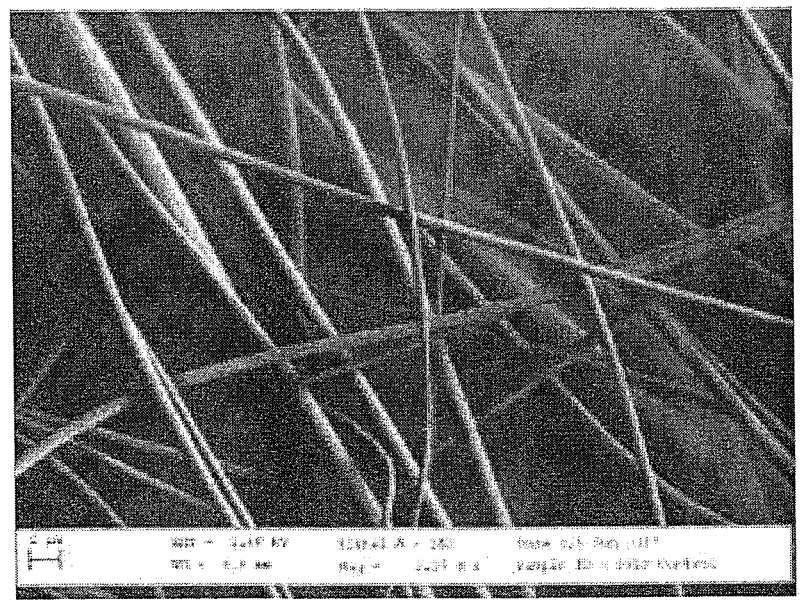
FIG. 5B depicts an SEM image of undoped PVDF fibers.
Figure 6:
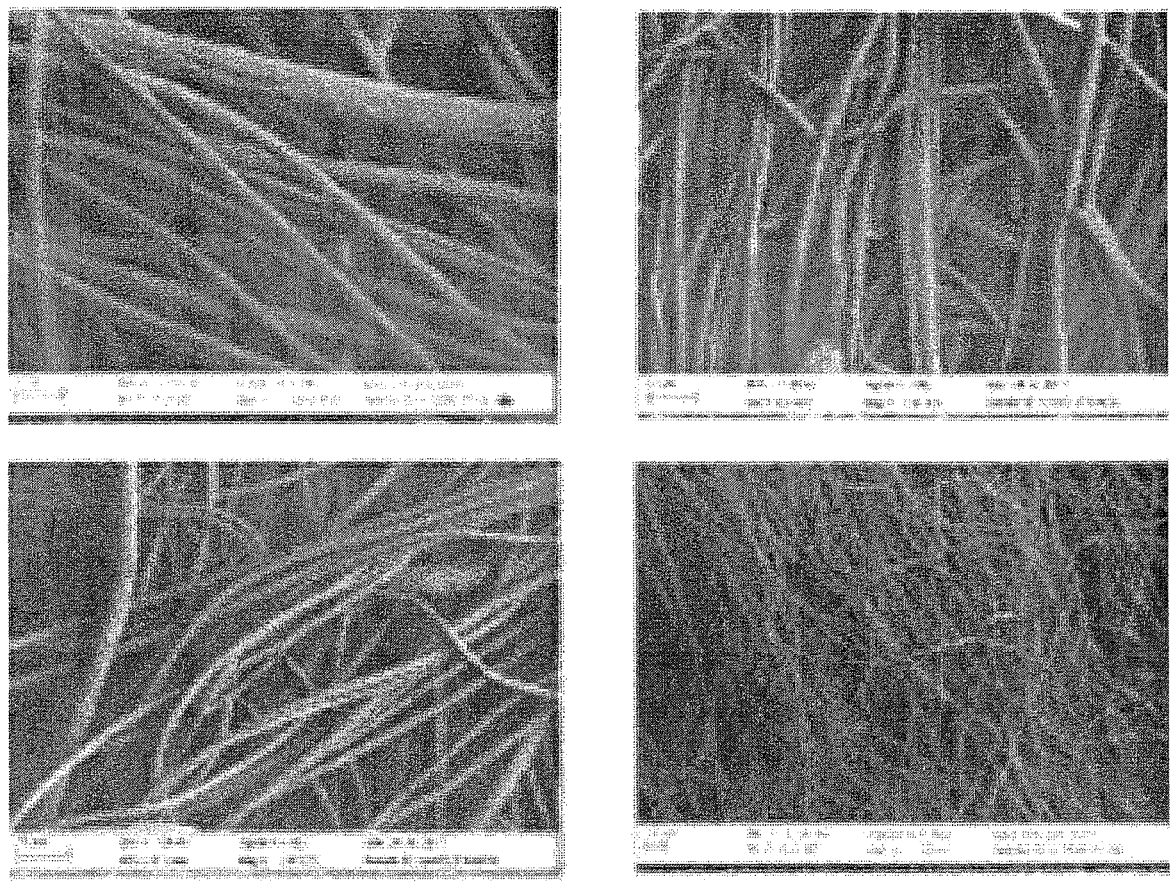
FIG. 6A depicts an SEM image of Eu complex doped PVDF fibers.
Figure 7A:
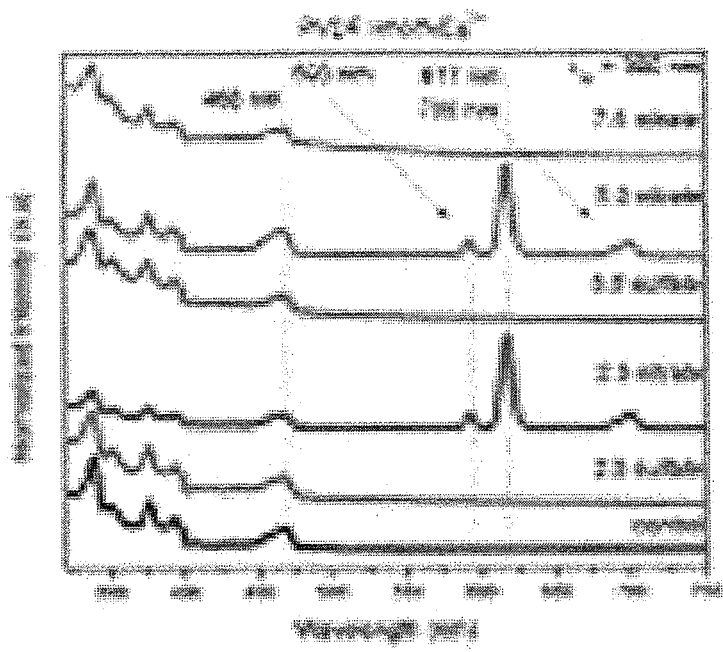
FIG. 7A depicts a normalized photoluminescence emission spectra of a series of PVDF fibers doped with cerium (IV) complexes.
Figure 7B:
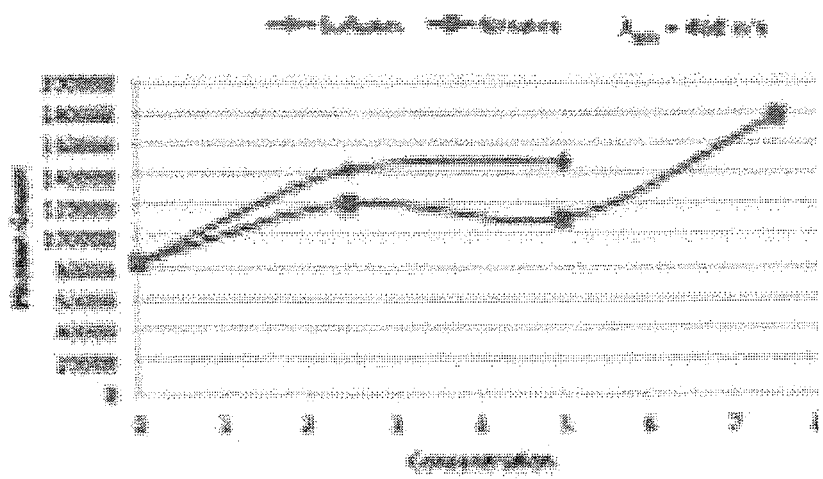
FIG. 7B depicts a photon count representation vs. concentration of $Ce^{+3}$ in cerium doped PVDF fibers.
Figure 8A:
FIG. 8A depicts a picture of a Eu complex doped PVDF nonwoven fiber film.
Figure 8B:
FIG. 8B depicts a picture of a Eu complex doped PVDF nonwoven fiber film after having been poked with a glass rod, light is emitted from poked areas.
Figure 8C:
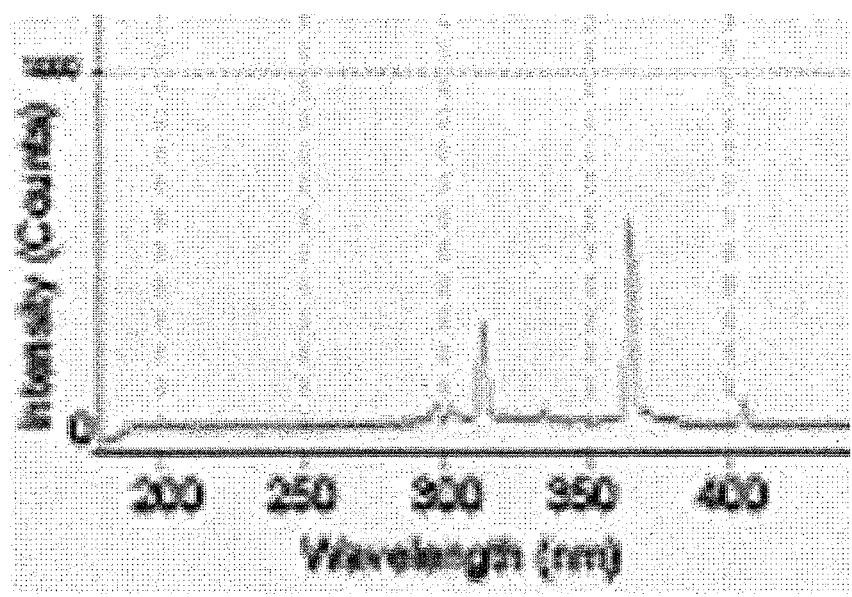
FIG. 8C depicts the emission spectra of the film exposed to mechanical forces.

FIG. 5A depicts an SEM image of 5% Ce sulfate doped PVDF fibers and FIG. 5B depicts an SEM image of undoped PVDF fibers.

Experiment 2

This experiment focuses on the development and optimization of a scalable method to produce Europium complex doped polyvinyl-difluoride fine fibers. Centrifugal spinning was utilized to obtain nonwoven fiber mats of the europium complex doped polyvinyl-difluoride fine fibers. Processing key variables were angular spinning velocity, and concentration of cerium complex. Scanning electron microscopy, X-ray diffraction, Fourier transform infrared spectroscopy, piezoelectricity and luminescence analysis was conducted. The developed system showed a significant enhancement in the beta phase and inhibition of the non-polar alpha phase upon fiber formation. Upon tapping the flexible nonwoven fiber mat light emission was observed and analyzed.

Experimental Method

FIG. 3 shows a schematic diagram of fiber formation using centrifugal spinning. The polymer solution is forced through the orifices of the spinneret by applying centrifugal force. As polymer solution is ejected through the orifices, continuous polymer jets are formed and are stretched into formation of fine web of fibers due to applied centrifugal force and shear force acting across the tip of orifices of the spinneret. The web is collected on a collector system. Fiber formation and morphology of the formed web are dictated by solution concentration, rotational speed, distance between collection system and spinneret and gauge size of the spinneret.

Solutions were prepared by dissolving polyvinyl-difluoride (PVDF) in a 1:1 mixture of N,N-dimethylacetamide (DMA) and acetone. Various concentrations of europium (III) nitrate hexahydrate ($Eu(NO_3)_3.6H_2O$) and Europium (III) sulfate octahydrate ($Eu(SO_4)_3.8H_2O$) were added (2.5% wt, 5% wt, 7.5% wt) to the polymer solution Fibers were produced in a Cyclone L1000M (Fiberio Technology Corporation) system. Angular velocity ranged from 4000-8000 RPM. Fibers were carefully collected in an aligned configuration using a square collector.

The resulting fibers were tested using scanning electron microscopy, X-ray diffraction, Fourier transform infrared spectroscopy, piezoelectricity and mechanoluminescence analysis.

Results

FIG. 10A depicts a normalized photoluminescence excitation for a series of PVDF fibers doped with Eu complex nitrate (2.5% wt, 5% wt, 7.5% wt) and Eu complex sulfate (2.5% wt, 5% wt). FIG. 10B depicts a photon count representation vs. concentration of Eu in Eu doped PVDF fibers.

FIG. 11A depicts a picture of the untapped Eu/PVDF non woven fiber mat.

FIG. 11B depicts a picture of a Eu complex doped PVDF nonwoven fiber film after having been poked with a glass rod, light is emitted from poked areas FIG. 11C depicts the emission spectra of the film exposed to mechanical forces.

Discussion

SEM analysis showed the formation of homogeneous, long continuous nanofibers. FTIR and XRD both showed the polymorphic nature of the PVDF with a significant enhancement of the beta phase while suppressing the alpha phase upon fiber formation. Oscilloscope testing showed a piezoelectric response, 2.6V were observed upon tapping the sample. Luminescence analysis showed the highest intensity to the 5.0% doping concentration of $Ce^{3+}$ for both nitrates and sulfates. The cerium(III) complex doped PVDF composite fiber mat exhibits an intense photoluminescence in the UV region, which might be due to a participation of the electron cloud from negative pole of bipolarized PVDF. In fact, the PVDF polymer presents a natural fluorescence with a maximum centered at 514 nm which is broadened when $Ce^{3+}$ is added, emitting between 489 (green region) and 616 nm (orange region). The PVDF:xmol % $Ce^{3+}$ nanofibers show blue emission when excited at different excitation wavelengths (300 and 468 nm).

Cerium doped PVDF composite fibers were developed through a centrifugal spinning method. Optimization studies were conducted and an average fiber diameter of 600 nm was obtained with a yield higher than 1 g/min. Piezoelectricity and photoluminescence was observed in the developed non-woven fiber mats.

Eu complex doped PVDF nonwoven composite mats were shown to exhibit mechanoluminescence.

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method of producing mechanoluminescent fibers, comprising:
   placing a solution comprising a polyvinyl-difluoride polymer and a rare earth complex into a body of a fiber producing device, the body comprising one or more openings;
   rotating the fiber producing device at a speed sufficient to cause the solution in the body to be passed through one or more openings to produce rare earth metal doped fibers; and
   collecting at least a portion of the produced rare earth metal doped fibers, wherein the produced rare earth metal doped fibers are mechanoluminescent fibers.

2. The method of claim 1, wherein the rare earth metal doped fibers are created without subjecting the rare earth metal doped fibers, during their creation, to an externally applied electric field.

3. The method of claim 1, wherein rare earth metal is a cerium metal salt.

4. The method of claim 1, wherein the rare earth metal is a europium metal salt.

5. The method of claim 1, wherein the rare earth metal is a nitrate salt.

6. The method of claim 1, wherein the rare earth metal is a sulfate salt.

7. The method of claim 1, wherein the fibers are collected as a mat of the fibers.

8. The method of claim 1, wherein the fibers are collected by depositing the fibers onto a support.

9. The method of claim 1, wherein the rare earth metal doped fibers comprise microfibers.

10. The method of claim 1, wherein the rare earth metal doped fibers comprise nanofibers.

* * * * *